United States Patent
Gruber et al.

(10) Patent No.: US 8,451,636 B2
(45) Date of Patent: May 28, 2013

(54) STATIC CONVERTER AND METHOD FOR STARTING UP THE CONVERTER

(75) Inventors: Rainer Gruber, Heilsbronn (DE); Ulrich Halfmann, Bräuningshof (DE); Jörg Lehmpfuhl, Erlangen (DE); Erich Rettensteiner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 12/836,889

(22) Filed: Jul. 15, 2010

(65) Prior Publication Data
US 2011/0013441 A1 Jan. 20, 2011

(30) Foreign Application Priority Data
Jul. 15, 2009 (DE) .................... 10 2009 033 515

(51) Int. Cl.
*H02J 3/36* (2006.01)
(52) U.S. Cl.
USPC .................................................. 363/35
(58) Field of Classification Search
USPC ................... 363/34, 35, 131, 132
See application file for complete search history.

(56) References Cited

U.S. PATENT DOCUMENTS

| | | | | |
|---|---|---|---|---|
| 6,259,616 B1* | 7/2001 | Ekwall et al. | ............... | 363/132 |
| 6,898,095 B2* | 5/2005 | Bijlenga et al. | ............. | 363/132 |
| 7,269,037 B2* | 9/2007 | Marquardt | ................... | 363/71 |
| 7,969,755 B2* | 6/2011 | Davies et al. | ................ | 363/35 |
| 2005/0083716 A1* | 4/2005 | Marquardt | ................. | 363/132 |
| 2007/0109823 A1 | 5/2007 | Rastogi et al. | | |
| 2008/0310205 A1* | 12/2008 | Hiller | ......................... | 363/131 |
| 2010/0213921 A1 | 8/2010 | Abolhassani et al. | | |

FOREIGN PATENT DOCUMENTS

| | | |
|---|---|---|
| DE | 10103031 A1 | 7/2002 |
| DE | 10146868 A1 | 4/2003 |

OTHER PUBLICATIONS

Martin Veenstra et al., "Control of a Hybrid Asymmetric Multilevel Inverter for Competitive Medium-Voltage Industrial Drives," IEEE Transactions of Industry Applications, IEEE Service Center, Piscataway, NJ, US, vol. 41, No. 2, Mar. 1, 2005, p. 655-664, XP011129530, ISSN: 0093-9994, DOI: 10.1109/TIA.2005.844382, p. 657, chapter II; Others, 2005.

(Continued)

*Primary Examiner* — Jue Zhang
(74) *Attorney, Agent, or Firm* — Harness, Dickey & Pierce, P.L.C.

(57) ABSTRACT

A static converter that includes a power converter circuit having a plurality of interconnected module branches. Each module branch may have one or more electrically series-connected two-pole submodules as switchable voltage sources which each include a capacitor as an energy store and power semiconductors as electronic switching elements. A device for precharging the capacitors is included that has at least one power electronics device for providing an adjustable precharge current. The at least one power electronics device, being supplied with power by an auxiliary supply system and being connected to a converter bridge via a precharge transformer, can be used to achieve a sufficiently high voltage level for the capacitors of the submodules when the converter is started up so as to achieve firstly the minimum voltage for supplying power to the power semiconductors and secondly the minimum voltage for synchronization to the systems.

18 Claims, 4 Drawing Sheets

OTHER PUBLICATIONS

Shuai Lu et al., "High Power Motor Drives Based on Hybrid Multi-level Converters and Direct Torque Control," Applied Power Electronics Conference, APEC 2007—Twenty Second Annual IEEE, IEEE, PI, 1. Feb. 2007, p. 1077-1083, XP031085344, ISBN: 978-1-4244-0713-2, chapter [000V], figure 1; Others; 2007.

R. Marquardt, A. Lesnicar, Institute of Power Electronics and Control Universität der Bundeswehr München, Germany; Others.

M. Glinka, R. Marquardt, Institute of Power Electronics and Control Universität der Bundeswehr München, Germany; Others.

Glinka, M.: "Prototype of Multiphase Modular-Multilevel-Converter with 2MW power rating and 17-level-output-voltage". PESC 2004 Conference, Aachen, Germany, 2004; Others.

* cited by examiner

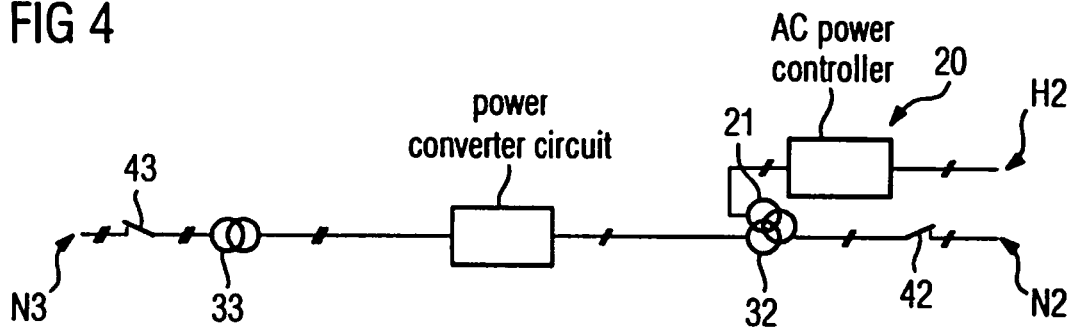
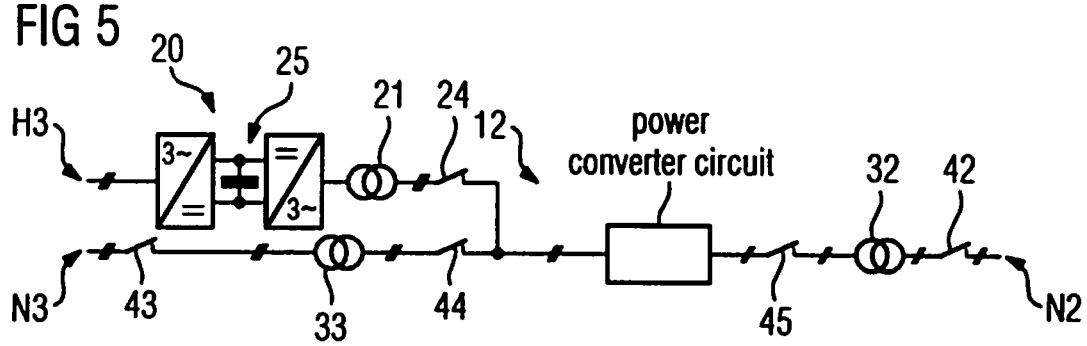
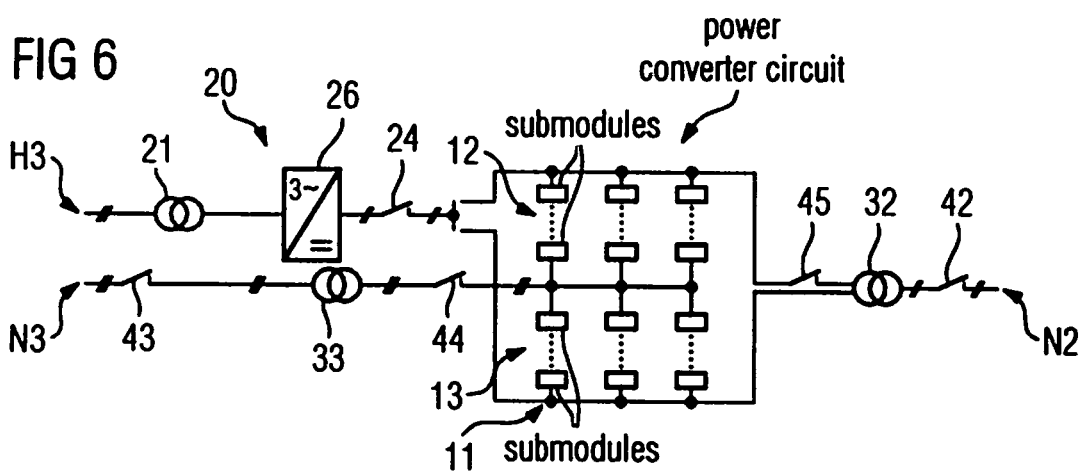

STATIC CONVERTER AND METHOD FOR STARTING UP THE CONVERTER

PRIORITY STATEMENT

The present application hereby claims priority under 35 U.S.C. §119 on German patent application number DE 10 2009 033 515.3 filed Jul. 15, 2009, the entire contents of which are hereby incorporated herein by reference.

FIELD

At least one embodiment of the invention generally relates to a static converter and/or to a method for starting up the converter.

BACKGROUND

Static converters of this kind are preferably used for system applications in the high power range of typically greater than 10 MVA.

One area of use is high-voltage DC transmission systems, wherein electrical power is transmitted over long line lengths using DC at high voltage of above 100 kV, the ends of the line lengths being connected to power converter stations with static converters of the type cited at the outset.

A further area of use is static power-factor correction systems in which static converters of the type cited at the outset improve the voltage quality and stability in transmission systems, allow the system connection of energy sources which provide a fluctuating supply, and compensate for reactive powers and flicker in industrial installations.

Another area of use for such converters is substations for the supply of traction to rail vehicles, which form the interfaces between a public high-voltage system, subsequently called national system, and the high-voltage system for supplying power to railways, subsequently called railway system. Whereas the railway systems are of single-phase design and have a frequency of 16.7 Hz or 25 Hz, the powering national systems are of three-phase design and have a frequency of 50 Hz or 60 Hz. To couple these two different systems, the converters of the type cited at the outset are used as static frequency converters.

A static converter of the type cited at the outset has a plurality of module branches which—depending on converter type—can be interconnected in a B6 bridge circuit or else in a delta circuit. In this arrangement, a plurality of submodules are electrically series-connected in each module branch. The voltage per submodule is typically approximately 1 to 3 kV; the voltage of a module branch may—depending on application—be in the range from approximately 10 kV to several 100 kV. Each submodule is in the form of a half-bridge or full-bridge circuit and has an associated capacitor as energy store and also power semiconductors as switching elements. The power semiconductors can connect the voltage of the capacitor to their power terminals with one or two polarities and also zero. A regulatory system actuates the submodules such that the series connection of the voltages to the power terminals of the two-pole submodules sets the currently desired total voltage of a module branch. The voltage tapped off between two module branches of a phase module can be set almost arbitrarily so as to build up the almost sinusoidal voltage. Static converters of this kind are referred to as modular multilevel power converters. A single-phase power converter with two phase modules and a three-phase power converter with three phase modules are known from "A New Single Phase AC/AC-Multilevel Converter For Traction Vehicles Operating On AC Line Voltage", for example, published by M. Glinka, R. Marquardt, at the 2003 EPE Conference in Toulouse. Similarly, it is possible to implement other multiphase power converters.

Besides the excellent electrical properties, converters of this kind are distinguished by their modular design. They can be used very versatilely and cost-efficiently and have a high level of redundancy and availability. Installations in the areas of use listed at the outset can be designed in a very space-saving manner by using such converters.

"New Concept for High Voltage—Modular Multilevel Converter", published by R. Marquardt, A. Lesnicar at the 2004 PESC Conference in Aachen, Germany, suggests a method for starting up such a converter which is intended to be used to charge the capacitors from a zero-voltage state to operating voltage. Charging the capacitors of a phase module requires an auxiliary voltage source with only a relatively low output voltage. In this case, the power semiconductors of a particular number of submodules in a module branch are connected such that the capacitors of these submodules are in the current path and are accordingly charged, whereas the capacitors of the other submodules are connected such that they are not in the current path. When a capacitor of the module branch has reached its operating voltage, appropriate switching selects the further capacitors. In this way, all capacitors in the module branches are charged to operating voltage in succession.

One particular feature of the submodules may be that the auxiliary voltage supply of the power semiconductors comes from the capacitor voltage, and said power semiconductors can therefore become active only from a particular minimum voltage onwards. When the converter is started up, it is therefore necessary to charge the capacitors of the submodules to the minimum voltage so that the converter can be connected to the supplying system or to a load. This process is called precharging. The method described above cannot be applied in this case, since the submodules cannot be actuated without an auxiliary voltage.

One opportunity for precharging is to connect the converter directly to the supplying system. A drawback in this context is that when the transformer between the system and the current converter is switched on, a greatly increased switch-on current can arise if the phase angle of the system voltage is unfavorable, because the iron core is driven to saturation. The associated reduction in the inductive reactance means that there is a brief flow of very large currents, called inrush currents. These inrush currents overlap the precharge currents, which can result in undesirably high loading on the network. Although switched precharge resistors can alleviate this problem, some power converter configurations do not allow the required minimum voltage for the capacitors to be achieved.

SUMMARY

In at least one embodiment, a converter and/or a method for starting up the converter is provided which allows a sufficiently high voltage level to be achieved for the capacitors of the submodules in order to achieve firstly the minimum voltage for the power supply for the submodule electronics and secondly the minimum voltage for synchronization to the systems.

In at least one embodiment, a device for precharging the capacitors is provided which has power electronics devices for providing an adjustable precharge current, particularly a limited and constant precharge current. By way of example, the power electronics devices may be in the form of power controllers, in the form of self-commutated converters or in the form of system-commutated or self-commutated rectifiers. The power electronics devices can be supplied with power by an auxiliary supply system, for example a low-voltage auxiliaries system. The power electronics devices are connected to the converter bridge via a precharge transformer which raises the low voltage to a voltage level which is suitable for the precharging. The precharge device according to at least one embodiment of the invention bypasses direct precharging of the capacitors from the power circuit or from the auxiliary supply system and avoids the accompanying large peak currents, which can have negative effects on the supplying system, particularly voltage dips. In contrast to precharge resistors, the at least one power electronics device is able not only to limit the precharge current but also to keep it at a constant value. This achieves relatively short precharge times.

In one example embodiment of the converter according to at least one embodiment of the invention, the power electronics device are in the form of a power controller operated using phase gating control. Power controllers are known per se and have two reverse-connected parallel thyristors or triacs. The phase gating allows the precharge voltage to be controlled and hence the precharge current to be limited to a defined value. Since the power for precharging corresponds to customary low-voltage loads, it is advantageously, possible to use commercially available power controllers.

In one advantageous embodiment of the converter according to the invention, for an auxiliary supply system in the form of a three-phase system or AC system the power electronics device(s) are in the form of a three-phase AC power controller or AC power controller. By choosing the suitable power controller, it is possible to customize a precharge device according to the invention to the available auxiliaries system.

In one example embodiment of the converter according to the invention, the power converter circuit is in the form of a B6 bridge circuit and is linked by way of power transformers and switching devices firstly to a three-phase system and secondly to a single-phase AC system. This embodiment is of significance particularly for the coupling of a three-phase national system to a single-phase railway system. Since the capacitors of the submodules are precharged from the auxiliaries system, the power transformers can be magnetized by the converter bridge side without inrush when the switching device between the power transformer and the converter bridge has been turned on. The voltage of the power converter circuit can then be synchronized to the system voltage, the system power switch turned on and the power converter circuit thus connected to the systems smoothly.

In one alternative example embodiment of the converter according to the invention, the power converter circuit is in the form of a delta circuit and is linked by way of power transformers and switching devices to a three-phase system. This embodiment can advantageously be used for applications for power-factor correction (Static Var Compensation).

Preferably, the precharge device of the converter according to at least one embodiment of the invention is connected to the power converter circuit on the three-phase side or on the AC side when the auxiliary supply system is in the form of a three-phase system or in the form of an AC system. Advantageously, the precharge device according to the invention can be connected to the power converter circuit by the national system side or by the railway system side. In the case of the high-voltage DC transmission, it would be the DC side.

In one advantageous embodiment of the converter according to at least one embodiment of the invention, the precharge transformer is in the form of a third winding in a power transformer. This allows space and cots to be saved for a dedicated precharge transformer.

In at least one embodiment, a method for starting up a static converter is disclosed. The capacitors of the submodules are first of all charged to a prescribed minimum voltage which is required for activating the power semiconductors. This involves the output voltage of the power controller being gradually increased by way of phase gating control such that the precharge current is limited and kept constant until the precharge current is reduced by the back-e.m.f. of the submodules and the capacitors have been charged to the minimum voltage.

Preferably, the power semiconductors are then actuated such that the capacitors of the submodules are charged to operating voltage.

With further preference, the present voltage profile of the supplying auxiliary supply system is taken into account for the regulation of the precharge current by the power electronics device(s). The inclusion of the present voltage of the auxiliary supply system in the regulation allows further minimization of the precharge time for a changing capacitance or preloading of the auxiliary supply system.

In addition, the power transformers are preferably subsequently magnetized and synchronized to the system voltages.

Finally, the power converter circuit is preferably connected to a linked system when the minimum voltage has been reached.

BRIEF DESCRIPTION OF THE DRAWINGS

Further characteristics and advantages of the invention can be found in the description of the example embodiments below with reference to the drawings, in which
FIG. 4 shows a fourth example embodiment,
FIG. 5 shows a fifth example embodiment,
FIG. 6 shows a sixth example embodiment.

DETAILED DESCRIPTION OF THE EXAMPLE EMBODIMENTS

Figure 1:
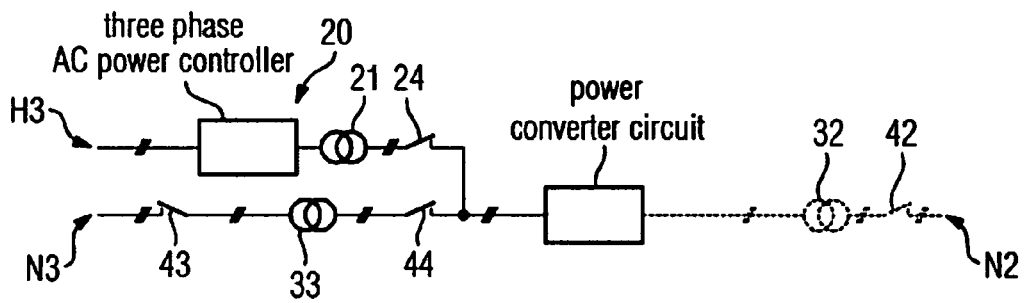
FIG. 1 shows a first example embodiment.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The example embodiments shown in FIG. 1 TO FIG. 6 relate to the application of a static converter according to the invention for coupling a railway system to a national system. The supplying national system in the form of a three-phase system N3 delivers a system voltage 110 kV at a system frequency of 50 Hz, whereas the drawing railway system is a single-phase AC system N2 with a system voltage of 15 kV or 110 kV and a system frequency of 16.7 Hz.

Figure 11:
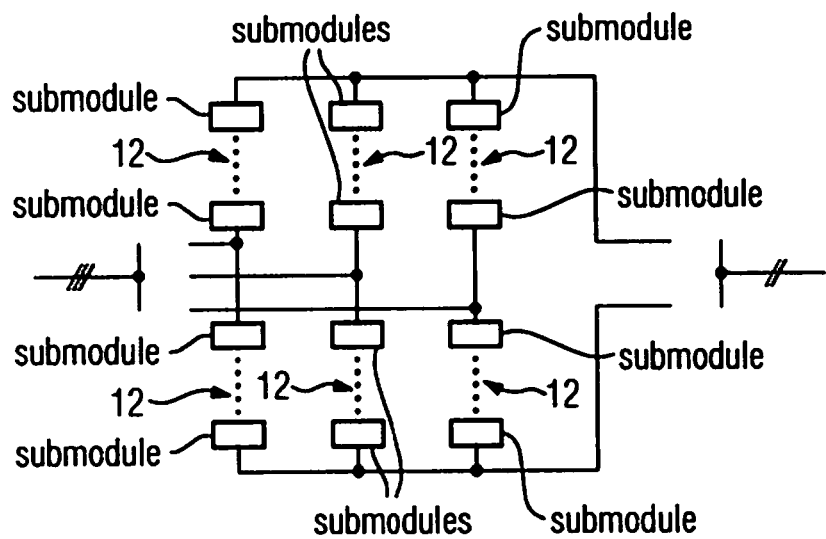
FIG. 11 shows a power converter circuit in a B6 bridge arrangement.

According to FIG. 11, the power converter circuit 10 has three pairs of module branches 12 which are arranged in a B6 bridge circuit. Alternatively, the power converter circuit 10 shown in FIG. 12 has three module branches 12 arranged in a delta circuit.

Figure 7:
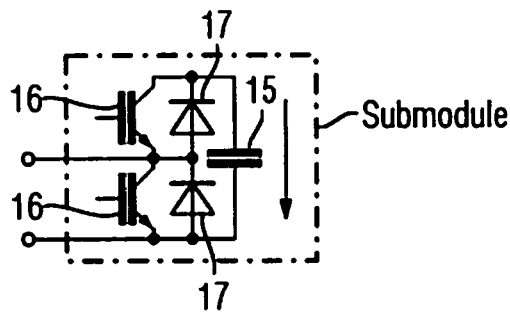
FIG. 7 shows a submodule in the form of a half-bridge.
Figure 8:
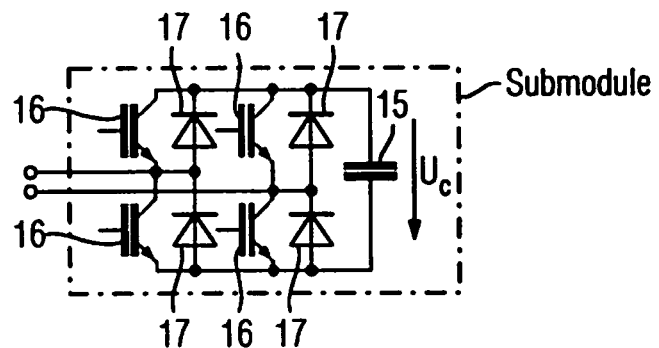
FIG. 8 shows a submodule in the form of a full-bridge.

Each module branch 12 has electrically series-connected submodules 14 which act as two-pole switchable voltage sources. To this end, a submodule 14 has a capacitor 15 as energy store and power semiconductors 16 and also diodes 17 as shown in FIG. 7 in a half-bridge circuit or as shown in FIG. 8 in a full-bridge circuit. The voltage per submodule 14 is typically approximately 1 kV to 3 kV, whereas the voltage per module branch 12 is in the range from approximately 10 kV to several 100 kV, depending on application.

The power converter circuit 10 is linked to the supplying three-phase system N3 by way of a power transformer and to the drawing railway system N2 by way of a power transformer 32, the rated powers of which are in the range from approximately 10 MVA to 100 MVA. The secondary side of the power transformer 32 on the AC side is provided with a switching device 42, while the primary side of the power transformer 33 on the three-phase side is provided with a switching device 43. A further switching device 44 is arranged between the power transformer 33 on the three-phase side and the converter bridge 10.

Figure 3:
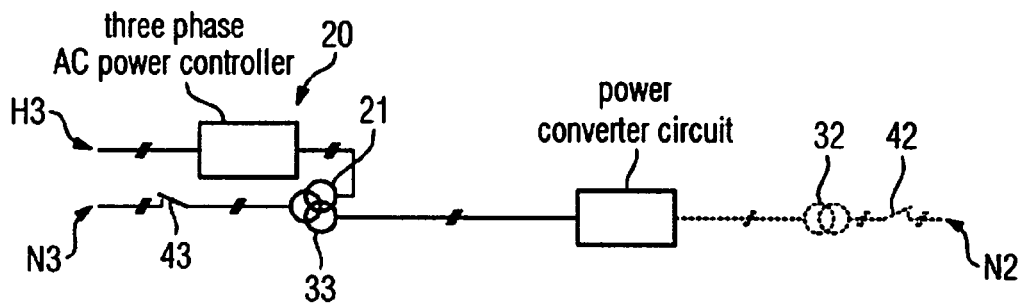
FIG. 3 shows a third example embodiment.
Figure 12:
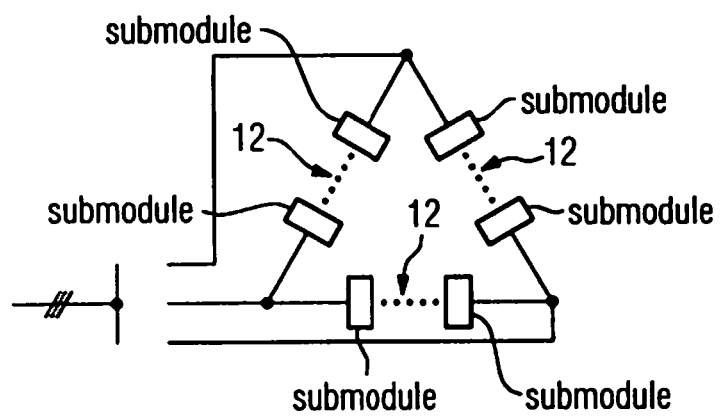
FIG. 12 shows a power converter circuit in a delta circuit of a converter according to an example embodiment of the invention by way of schematic diagrams in the form of one-line diagrams.

In the example embodiments shown in FIG. 1 AND FIG. 3, the AC side is shown in dashes, since other applications besides the railway system coupling are also conceivable; thus, by way of example, a high-voltage DC transmission installation could have a further power converter circuit mirrored with respect to the power converter circuit 10. For this application, the power converter circuit 10 in the B6 bridge structure shown in FIG. 11 is also used. For the power-factor correction, the portion shown in FIG. 1 AND FIG. 3 is dispensed with and the power converter circuit 10 is preferably in the form of a delta circuit as shown in FIG. 12.

Since, during operation of the converter according to an embodiment of the invention, the power electronics 16 of the submodules 14 are supplied with power by the capacitors 15 thereof, said capacitors need to be precharged first of all to a prescribable minimum voltage sufficient for activating the control electronics 16 when the converter is started up or started. To this end, the invention provides a device 20 for precharging which has power electronics device(s) for providing a limited and constant precharge current. The power electronics device(s) are supplied with power by an auxiliary supply system, which may be in the form of an AC system H2 or a three-phase system H3. By way of example, the auxiliary supply system could be formed by an auxiliaries installation in a railway substation, said auxiliaries installation supplying the power electronics device(s) with low voltage of 400 V. In order to raise the output voltage of the power electronics devices to a level which is suitable for precharging the capacitors 15, the precharge device 20 has a precharge transformer 21 which is connected to the power converter circuit 10 via a switching device 24.

Figure 2:
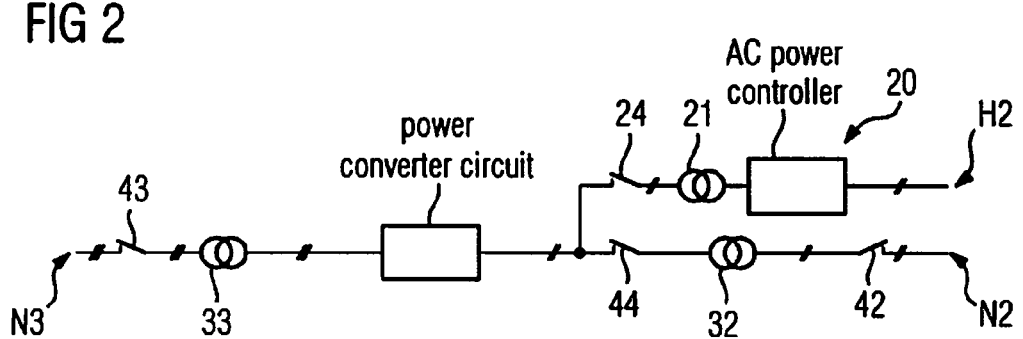
FIG. 2 shows a second example embodiment.
Figure 9:
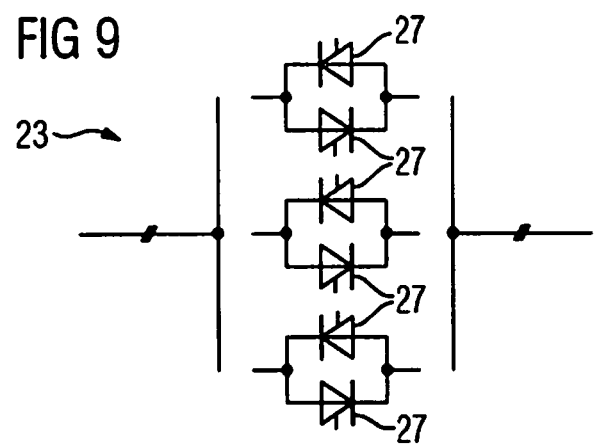
FIG. 9 shows a three-phase AC power controller.
Figure 10:
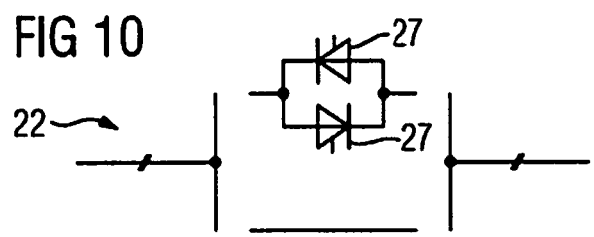
FIG. 10 shows an AC power controller.

In the example embodiments shown in FIG. 1 and FIG. 3, the precharge device 20 is supplied with power by a three-phase auxiliary supply system H3, wherein the power electronics device(s) are in the form of a three-phase AC power controller 23. By contrast, the power electronics device(s) in the example embodiments shown in FIG. 2 and FIG. 4 are in the form of an AC power controller 22, the latter being supplied with power by an AC auxiliary supply system H2. According to FIG. 9 and FIG. 10, a three-phase AC power controller or AC power controller respectively has two reverse-connected parallel thyristors 27 or triacs which are actuated with phase gating to produce a constant precharge current. According to FIG. 1 and FIG. 3, the precharge device 20 with three-phase AC power controller 23 is connected on the three-phase side of the power converter circuit 10. According to FIG. 2 and FIG. 4, the precharge device 20 with AC power controller 22 is connected on the AC side of the converter bridge 10. When connecting to the railway side, the precharge device 20 can be supplied with power from the single-phase railway system, for example.

In the example embodiments shown in FIG. 1 and FIG. 2, the precharge transformers 21 are in the form of separate components, whereas in the example embodiments shown in FIG. 3 and FIG. 4 they are in the form of a third winding of the relevant power transformer 33 or 32. In principle, the latter embodiment has the drawback that the magnetization of the power transformer 33 or 32 needs to be applied from the low-voltage auxiliaries system H3 or H2 and that the relevant transformer 33 or 32 needs to be designed accordingly.

FIG. 5 and FIG. 6 show two further example embodiments, the precharge devices 20 of which are supplied with power from the low-voltage auxiliaries system H3. According to FIG. 5, the power electronics device(s) provided are a self-commutated converter 25, which is more complex than a three-phase AC power controller, however. According to FIG. 6, the power electronics device(s) may also be in the form of a system-commutated or self-commutated rectifier 26 between precharged transformer 21 and power converter circuit 10. In this case, the rectifier 26 needs to be designed for the high precharge voltage. The submodules 14 are charged by the DC voltage, which needs to be increased progressively in the course of the precharging. In this case too, the complexity is very high.

Overall, an example embodiment of the invention uses known power electronics devices, particularly uses power controllers 23 and 22, and uses a known control method with phase gating to achieve precharging of submodule capacitors 15 in a passive phase, the precharge current being able to be limited and kept essentially constant. Precharging from the low-voltage-system auxiliaries system is made possible, with voltage dips being kept within limits. Since the power for the precharging corresponds to customary low-voltage loads, it is possible to use a commercially available low-voltage three-phase AC power controller. The power transformers can be magnetized from the power converter circuit 10 side without inrush when the switch 44 has been turned on. The power converter circuit 10 can then be synchronized to the system N3 and connected smoothly by turning on the system power switch 43. Relatively short precharge times are achieved which can additionally be minimized by including the present voltage of the auxiliary supply system H3 in the regulation.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A static converter comprising:
a power converter circuit including a plurality of interconnected module branches, each of the plurality of interconnected module branches including one or more electrically series-connected two-pole submodules as switchable voltage sources which each comprise a capacitor as an energy store and power semiconductors as electronic switching elements; and
a device for precharging the capacitors, including at least one power electronics device to provide an adjustable precharge current, said at least one power electronics device being supplied with power by an auxiliary supply system and being connected to the power converter circuit via a precharge transformer, wherein the at least one power electronics device is in the form of a power controller operated using phase gating control to control and limit the precharge current to a defined value, the defined value being adjusted so to precharge the capacitors to a prescribable minimum voltage sufficient for activating the power semiconductors when the converter is started up or started.

2. The static converter as claimed in claim 1, wherein, for an auxiliary supply system in the form of a three-phase system or AC system, the at least one power electronics device is in the form of a three-phase AC power controller or AC power controller.

3. The static converter as claimed in claim 2, wherein the power converter circuit is in the form of a bridge circuit and is linked by way of power transformers and switching devices firstly to a three-phase system and secondly to a single-phase AC system.

4. The static converter as claimed in claim 2, wherein the power converter circuit is in the form of a delta circuit and is linked by way of power transformers and switching devices to a three-phase system.

5. The static converter as claimed in claim 1, wherein the power converter circuit is in the form of a bridge circuit and is linked by way of power transformers and switching devices firstly to a three-phase system and secondly to a single-phase AC system.

6. The static converter as claimed in claim 5, wherein the precharge transformer is connected to the power converter circuit on the three-phase side or on the AC side when the auxiliary supply system is in the form of a three-phase system or in the form of an AC system.

7. The static converter as claimed in claim 5, wherein the precharge transformer is in the form of a third winding in a power transformer.

8. The static converter as claimed in claim 1, wherein the power converter circuit is in the form of a delta circuit and is linked by way of power transformers and switching devices to a three-phase system.

9. The static converter as claimed in claim 8, wherein the precharge transformer is connected to the power converter circuit on the three-phase side or on the AC side when the auxiliary supply system is in the form of a three-phase system or in the form of an AC system.

10. The static converter as claimed in claim 1, wherein the power controller is configured to gradually increase output voltage by way of the phase gating control such that the precharge current is limited and kept constant until the precharge current is reduced by the back-e.m.f. of the submodules and the capacitors have been charged to the minimum voltage.

11. A method for starting up a static converter comprising a power converter circuit including a plurality of interconnected module branches, each of the plurality of interconnected module branches including one or more electrically series-connected two-pole submodules as switchable voltage sources which each comprise a capacitor as an energy store and power semiconductors as electronic switching elements; and a device for precharging the capacitors, including at least one power electronics device to provide an adjustable precharge current, said at least one power electronics device being supplied with power by an auxiliary supply system and being connected to a power converter circuit via a precharge transformer, the method comprising:

charging the capacitors of the submodules to a minimum voltage required for activating actuation of the power semiconductors, by virtue of the output voltage of the power controller being gradually increased by way of phase gating control such that the precharge current is limited and kept constant until the precharge current is reduced by the back-e.m.f. of the submodules and the capacitors have been charged to the minimum voltage.

12. The method as claimed in claim 11, wherein the power semiconductors are then actuated such that the capacitors of the submodules are charged to operating voltage.

13. The method as claimed in claim 12, wherein the present voltage profile of the supplying auxiliary supply system is taken into account for the regulation of the precharge current by the at least one power electronics device.

14. The method as claimed in claim 12, wherein the power transformers are subsequently magnetized and synchronized to the system voltages.

15. The method as claimed in claim 12, wherein the power converter circuit is connected to a linked system when the minimum voltage has been reached.

16. The method as claimed in claim 11, wherein the present voltage profile of the supplying auxiliary supply system is taken into account for the regulation of the precharge current by the at least one power electronics device.

17. The method as claimed in claim 11, wherein the power transformers are subsequently magnetized and synchronized to the system voltages.

18. The method as claimed in claim 11, wherein the power converter circuit is connected to a linked system when the minimum voltage has been reached.

* * * * *